(12) United States Patent
Konno et al.

(10) Patent No.: US 12,427,568 B2
(45) Date of Patent: Sep. 30, 2025

(54) METHOD OF MANUFACTURING CASING OF TURBOCHARGER AND CASING OF TURBOCHARGER

(71) Applicant: MITSUBISHI HEAVY INDUSTRIES ENGINE & TURBOCHARGER, LTD., Sagamihara (JP)

(72) Inventors: Ryohei Konno, Sagamihara (JP); Kazuya Takeda, Sagamihara (JP); Wataru Murono, Sagamihara (JP); Yuya Konno, Tokyo (JP)

(73) Assignee: MITSUBISHI HEAVY INDUSTRIES ENGINE & TURBOCHARGER, LTD., Sagamihara (JP)

( * ) Notice: Subject to any disclaimer, the term of this patent is extended or adjusted under 35 U.S.C. 154(b) by 11 days.

(21) Appl. No.: 18/016,531

(22) PCT Filed: Sep. 24, 2020

(86) PCT No.: PCT/JP2020/036024
§ 371 (c)(1),
(2) Date: Jan. 17, 2023

(87) PCT Pub. No.: WO2022/064596
PCT Pub. Date: Mar. 31, 2022

(65) Prior Publication Data
US 2023/0340904 A1    Oct. 26, 2023

(51) Int. Cl.
*B22D 31/00* (2006.01)
*C23C 8/16* (2006.01)
*F01D 25/00* (2006.01)

(52) U.S. Cl.
CPC .............. *B22D 31/002* (2013.01); *C23C 8/16* (2013.01); *F01D 25/007* (2013.01);
(Continued)

(58) Field of Classification Search
CPC .... C23C 8/16; C23C 8/10; C23C 8/18; B22D 31/002; B22D 25/02; F01D 25/007;
(Continued)

(56) References Cited

U.S. PATENT DOCUMENTS 4,478,648 A * 10/1984 Zeilinger .................. C23C 8/16
148/281
4,655,043 A *  4/1987 McInerney ............ F01D 25/168
60/602
(Continued)

FOREIGN PATENT DOCUMENTS

DE    102009056875 A1 *  6/2011  ............... C23C 8/20
JP    56-50736 U     5/1981
(Continued)

OTHER PUBLICATIONS

Ammon, Machine Translation of DE102009056875, 2009 (Year: 2009).*
(Continued)

*Primary Examiner* — Courtney D Heinle
*Assistant Examiner* — Michael K. Reitz
(74) *Attorney, Agent, or Firm* — Birch, Stewart, Kolasch & Birch, LLP (57) ABSTRACT

A method of manufacturing a casing of a turbocharger includes: a steam treatment step of subjecting at least one of a turbine housing and a bearing housing to a steam treatment to form an oxide film on the at least one of the turbine housing and the bearing housing before assembling the turbine housing, the bearing housing and a compressor housing; and an assembling step of assembling the turbine housing, the bearing housing and the compressor housing.

14 Claims, 6 Drawing Sheets

(52) U.S. Cl.
CPC ...... *F05D 2220/40* (2013.01); *F05D 2230/60* (2013.01); *F05D 2230/90* (2013.01); *F05D 2260/95* (2013.01); *Y10T 29/4932* (2015.01)

(58) Field of Classification Search
CPC ............. Y10T 29/4932; F05D 2220/40; F05D 2230/60; F05D 2230/90; F05D 2260/95
See application file for complete search history.

(56) References Cited

U.S. PATENT DOCUMENTS

| | | | | |
|---|---|---|---|---|
| 6,123,748 | A | * | 9/2000 | Whitaker ............ C22C 33/0207 419/37 |
| 10,533,491 | B1 | * | 1/2020 | Milburn ................ F02B 37/186 |
| 2003/0007882 | A1 | * | 1/2003 | Perrin ..................... C22C 37/10 420/28 |
| 2015/0093238 | A1 | | 4/2015 | Kanbara et al. |
| 2016/0339545 | A1 | | 11/2016 | Sordelet et al. |

FOREIGN PATENT DOCUMENTS

| | | |
|---|---|---|
| JP | 60-23221 U | 2/1985 |
| JP | 2009-228859 A | 10/2009 |
| JP | 2010-38201 A | 2/2010 |
| JP | 5071886 B2 | 11/2012 |
| JP | 2013-230485 A | 11/2013 |
| JP | 2015-1218 A | 1/2015 |
| JP | 2020-128832 A | 8/2020 |

OTHER PUBLICATIONS

International Preliminary Report on Patentability and English translation of the Written Opinion of the International Searching Authority for International Application No. PCT/JP2020/036024, dated Apr. 6, 2023.

International Search Report and Written Opinion of the International Searching Authority for International Application No. PCT/JP2020/036024, dated Dec. 1, 2020.

Japanese Office Action dated Aug. 22, 2023 for Application No. 2022-551491 with an English translation.

* cited by examiner

METHOD OF MANUFACTURING CASING OF TURBOCHARGER AND CASING OF TURBOCHARGER

TECHNICAL FIELD

The present disclosure relates to a method of manufacturing a casing of a turbocharger and a casing of a turbocharger.

BACKGROUND

Patent Literature 1 describes a seal structure for limiting axial movement of fluid between a rotating shaft and a stationary member. This seal structure includes a ring groove formed on the outer peripheral surface of the rotating shaft and a seal ring housed in a seal groove. In addition, the seal ring is subjected to a steam treatment in order to improve wear resistance against friction with the rotating shaft.

CITATION LIST

Patent Literature

Patent Literature 1: JP5071886B

SUMMARY

Technical Problem

By the way, the casing of a turbocharger may be coated with anti-rust oil as a coating agent for anti-rust after it is assembled in an engine. However, with the conventional coating agent, the oil volatilizes during the operation of the turbocharger before shipment, resulting in a decrease in corrosion resistance, which may cause the casing to rust during transportation. In this respect, Patent Literature 1 does not disclose knowledge for improving the corrosion resistance of the casing of the turbocharger.

In view of the circumstances described above, an object of the present disclosure is to provide a method of manufacturing a casing of a turbocharger and a casing of a turbocharger that can improve the corrosion resistance of the casing.

Solution to Problem

In order to achieve the above-described object, a method of manufacturing a casing of a turbocharger according to the present disclosure is a method of manufacturing a casing of a turbocharger, the casing including a turbine housing that houses a turbine rotor of the turbocharger, a bearing housing that houses a bearing that rotatably supports the turbine rotor, and a compressor housing that houses a compressor impeller of the turbocharger, the method including: a steam treatment step of subjecting at least one of the turbine housing and the bearing housing to a steam treatment to form an oxide film on the at least one of the turbine housing and the bearing housing; and an assembling step of assembling the turbine housing, the bearing housing and the compressor housing.

To achieve the above-described object, a casing of a turbocharger according to an embodiment of the present disclosure is a casing of a turbocharger, including: a turbine housing that houses a turbine rotor of the turbocharger; and a bearing housing that houses a bearing that rotatably supports the turbine rotor, wherein a machined surface is formed on a surface of a portion of the bearing housing that fits with the turbine housing, and an oxide film is formed on at least a portion of the surface of the bearing housing excluding the portion that fits with the turbine housing.

To achieve the above-described object, a casing of a turbocharger according to an embodiment of the present disclosure is a casing of a turbocharger, including: a turbine housing that houses a turbine rotor of the turbocharger; and a bearing housing that houses a bearing that rotatably supports the turbine rotor, wherein an oxide film is formed on a machined surface of a portion of the bearing housing that fits with the turbine housing, and an oxide film is formed on a machined surface of a portion of the turbine housing that fits with the bearing housing.

Advantageous Effects

According to the present disclosure, a method of manufacturing a casing of a turbocharger and a casing of a turbocharger capable of improving the corrosion resistance of the casing are provided.

DETAILED DESCRIPTION

Embodiments of the present invention will now be described in detail with reference to the accompanying drawings. It is intended, however, that unless particularly specified, dimensions, materials, shapes, relative positions and the like of components described in the embodiments or in the drawings shall be interpreted as illustrative only and not limitative of the scope of the present invention.

For example, an expression of relative or absolute arrangement such as "in a direction", "along a direction", "parallel", "orthogonal", "centered", "concentric" and "coaxial" shall not be construed as indicating only the arrangement in a strict literal sense, but also includes a state in which the arrangement is relatively displaced by a tolerance, or by an angle or a distance whereby it is possible to achieve the same function.

For example, an expression of an equal state such as "same", "equal" and "uniform" shall not be construed as indicating only the state in which the feature is strictly equal, but also includes a state in which there is a tolerance or a difference that can still achieve the same function.

Furthermore, in the present specification, an expression of a shape such as a rectangular shape or a cylindrical shape shall not be construed as only the geometrically strict shape, but also includes a shape with unevenness or chamfered corners within the range in which the same effect can be achieved.

Furthermore, in the present specification, an expression such as "comprise", "equipped", "include", "contain" and "have" are not intended to be exclusive of other components.

Figure 1:
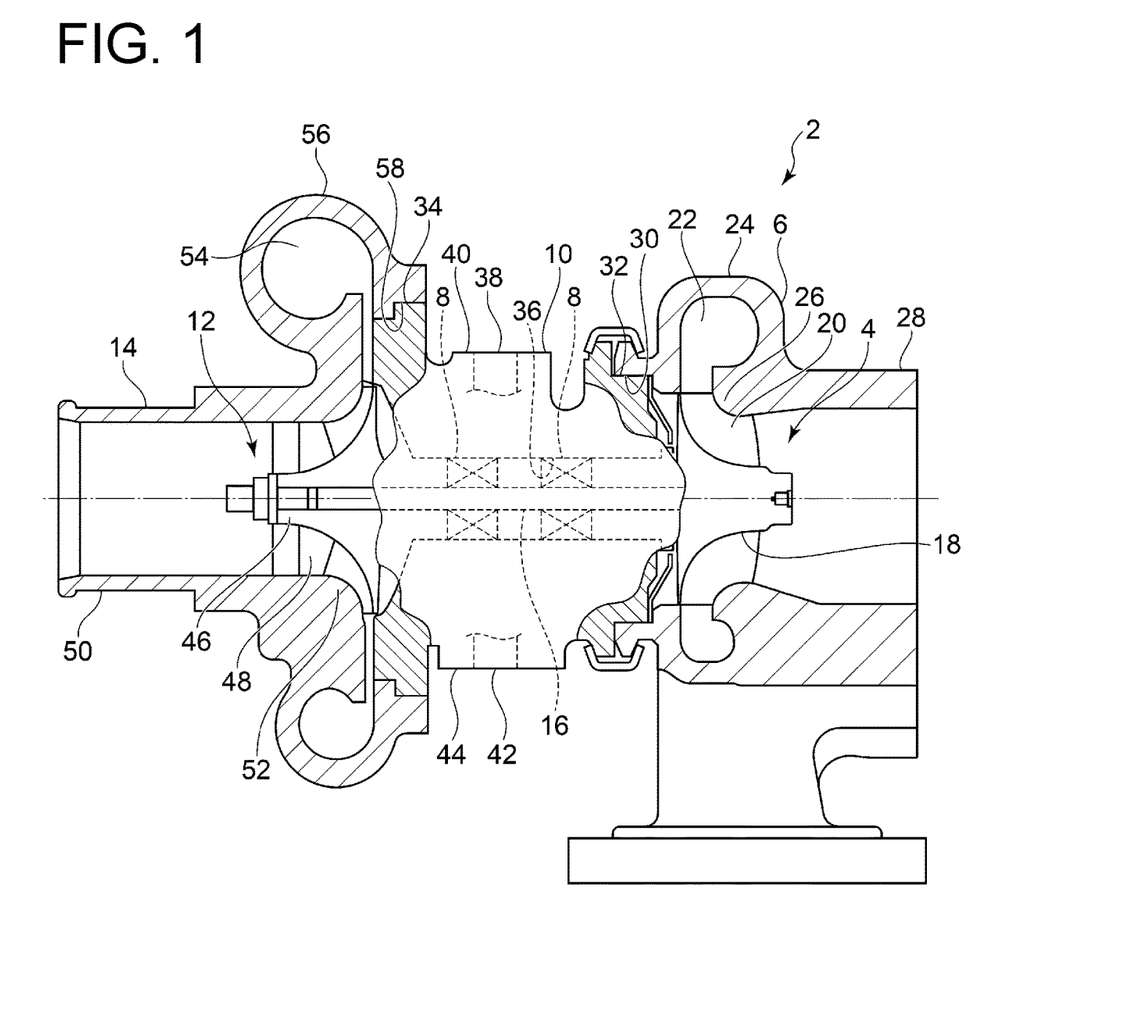
FIG. 1 is a partial cross-sectional view showing a schematic configuration of a turbocharger 2 according to an embodiment.

FIG. 1 is a partial cross-sectional view showing a schematic configuration of a turbocharger 2 according to an embodiment.

The turbocharger 2 includes a turbine rotor 4, a turbine housing 6, a bearing 8, a bearing housing 10, a compressor impeller 12 and a compressor housing 14.

The turbine rotor 4 and the compressor impeller 12 are connected via a shaft 16 and configured to rotate integrally. That is, the turbine rotor 4, the shaft 16, and the compressor impeller 12 form a rotating body 3 that rotates integrally. The turbine housing 6, the bearing housing 10, and the compressor housing 14 constitute a casing 5 that houses the rotating body 3.

Hereinafter, the axial direction of the shaft 16 is simply referred to as an "axial direction", the radial direction of the shaft 16 is simply referred to as a "radial direction", and the circumferential direction of the shaft 16 is simply referred to as a "circumferential direction".

The turbine rotor 4 includes a hub 18 and a plurality of turbine rotor blades 20 provided on the outer peripheral surface of the hub 18 at intervals in the circumferential direction.

The turbine housing 6 is configured to house the turbine rotor 4, and includes a scroll portion 24 forming a scroll passage 22, an annular shroud portion 26 that faces the tip of the turbine rotor blade 20 of the turbine rotor 4, an outlet pipe portion 28 that guides the exhaust gas that has passed through the turbine rotor 4 to the outside of the turbocharger 2, and an annular first portion 30 that fits with the bearing housing 10. The turbine housing 6 is molded by casting, for example, using cast iron, cast steel, or the like as a material.

The bearing 8 rotatably supports the turbine rotor 4 and the compressor impeller 12 by rotatably supporting the shaft 16. In the illustrated embodiment, a plurality of bearings 8 (two bearings 8) are provided at intervals in the axial direction.

The bearing housing 10 is configured to house the plurality of bearings 8. The bearing housing 10 includes an annular second portion 32 that fits with the first portion 30 of the turbine housing 6 and an annular third portion 34 that fits with the compressor housing 14.

The bearing housing 10 includes an annular bearing support portion 36 for supporting the bearing 8, a lubricating-oil inlet-side end surface 40 in which an inlet 38 for lubricating oil supplied to the bearing 8 is formed, and a lubricating-oil outlet-side end surface 44 in which an outlet 42 of the lubricating oil is formed. The lubricating-oil inlet-side end surface 40 is positioned on the upper surface of the bearing housing 10, and the lubricating-oil outlet-side end surface 44 is positioned on the lower surface of the bearing housing 10. A lubricating oil supply pipe (not shown) is connected to the lubricating-oil inlet-side end surface 40, and a lubricating oil discharge pipe (not shown) is connected to the lubricating-oil outlet-side end surface 44. The bearing housing 10 is molded by casting, for example, using cast iron or the like as a material.

The compressor impeller 12 includes a hub 46 and a plurality of compressor blades 48 provided on the outer peripheral surface of the hub 46 at intervals in the circumferential direction.

The compressor housing 14 includes an inlet pipe portion 50 that guides air to the compressor impeller 12, a shroud portion 52 that faces the tip of the compressor blade 48, a scroll portion 56 that forms a scroll passage 54, and an annular fourth portion 58 that fits with the third portion 34 of the bearing housing 10.

Figure 2:
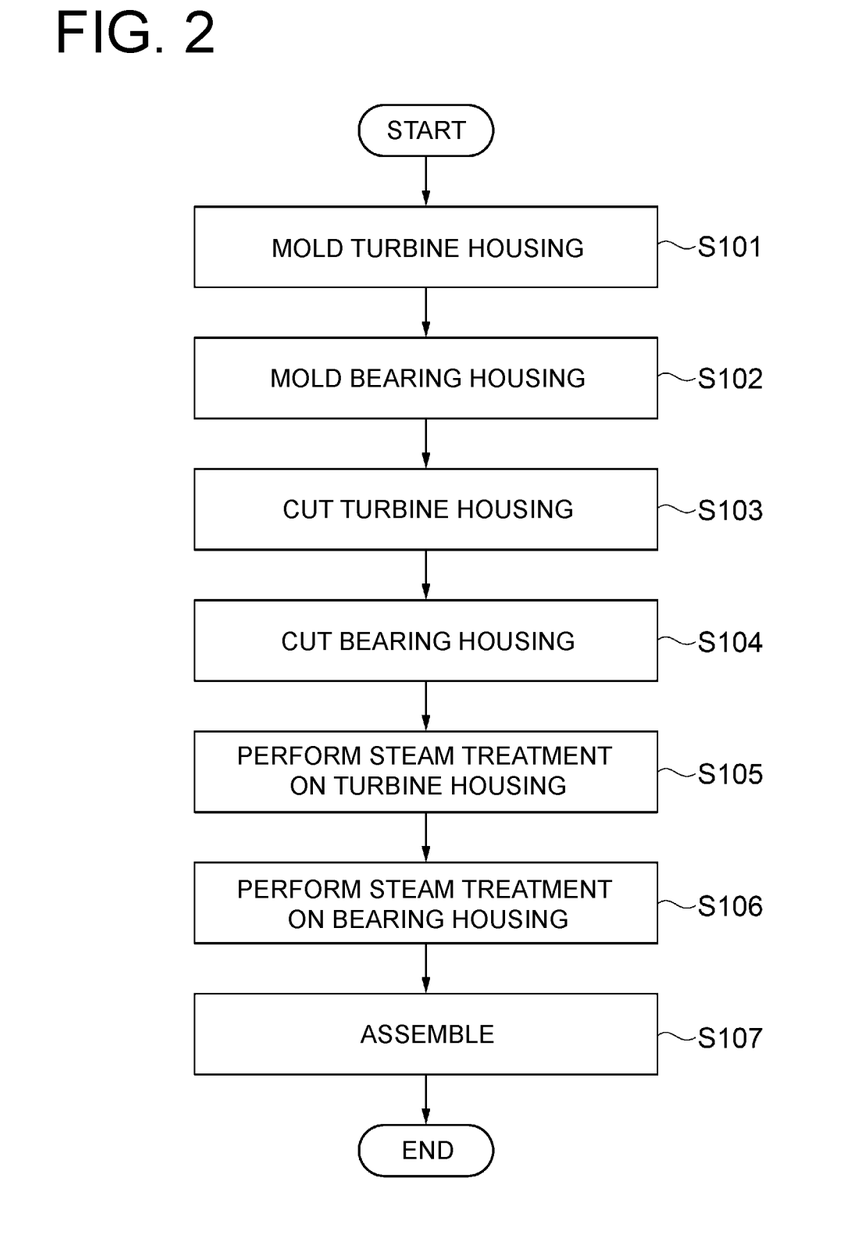
FIG. 2 is a flowchart showing an example of a method of manufacturing a casing 5 of the turbocharger 2.
Figure 3:
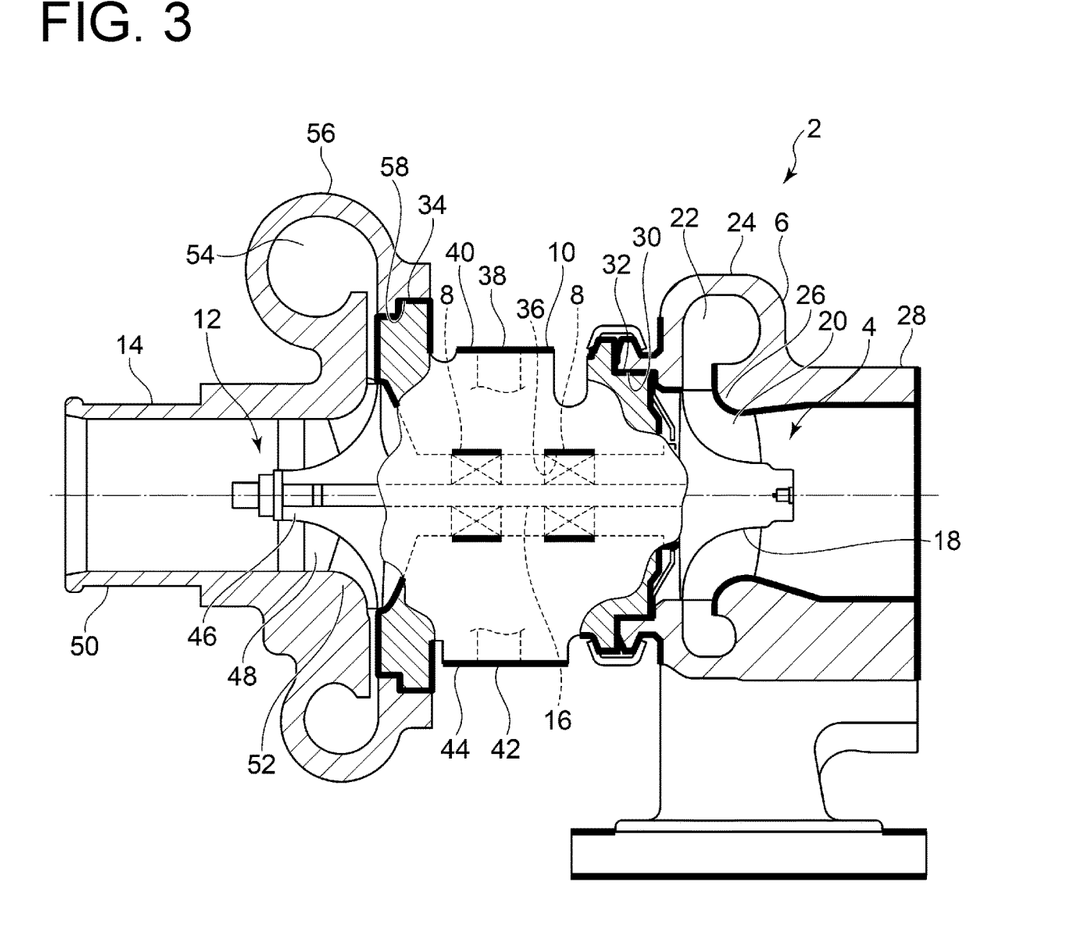
FIG. 3 is a diagram schematically showing an example of a portion of the casing 5 to be cut (a portion including a cutting allowance) with thick lines.

Next, an example of a method of manufacturing the casing 5 of the turbocharger 2 described above will be described with reference to FIGS. 2 and 3. FIG. 2 is a flowchart showing an example of a method of manufacturing the casing 5 of the turbocharger 2 described above. FIG. 3 is a diagram schematically showing an example of a portion (a portion corresponding to a cutting allowance) of the machined surface of the casing 5 to be cut with thick lines.

As shown in FIG. 2, in S101, the turbine housing 6 is molded by casting using the above-described materials. At this time, the turbine housing 6 is molded while leaving a cutting allowance in at least the first portion 30 of the turbine housing 6. In the example shown in FIG. 3, in addition to the first portion 30, the turbine housing 6 is molded while leaving a cutting allowance in the shroud wall surface of the turbine housing 6, the inner surface of the outlet pipe portion 28, the outlet-side end surface, and the like.

In S102, the bearing housing 10 is molded by casting using the above-described materials. At this time, the bearing housing 10 is molded while leaving a cutting allowance in at least the second portion 32 of the bearing housing 10. In the example shown in FIG. 3, the bearing housing 10 is molded while leaving a cutting allowance in the second portion 32, the third portion 34, the bearing support portion 36, the lubricating-oil inlet-side end surface 40, and the lubricating-oil outlet-side end surface 44 of the bearing housing 10. The dimensions of the bearing housing 10 molded in S102 are set in consideration of the thickness of the oxide film formed on the bearing housing 10, which will be described later.

In S103, as shown in FIG. 3, at least the first portion 30 (the portion to be fitted with the bearing housing 10) of the turbine housing 6 is cut so that the first portion 30 is machined to have dimensions and shape appropriate for being fitted with the bearing housing 10 with high accuracy. At this time, the cutting allowance of the turbine housing 6 is removed by cutting.

In S104, as shown in FIG. 3, at least the second portion 32 (the portion to be fitted with the first portion 30 of the turbine housing 6) of the bearing housing 10 is cut, so that the second portion 32 is machined to have dimensions and shape appropriate for being fitted with the turbine housing 6 with high accuracy. In the example shown in FIG. 3, furthermore, the bearing support portion 36 is machined to have dimensions and shape appropriate for being fitted with the outer peripheral surface of the bearing 8 with high accuracy. In addition, the lubricating-oil inlet-side end surface 40 and the lubricating-oil outlet-side end surface 44 are cut into smooth surfaces so that the lubricating oil does not leak. Further, the third portion 34 is machined to have dimensions and shape appropriate for being fitted with the compressor housing 14 with high accuracy. At this time, each of the cutting allowances of the bearing housing 10 is removed by cutting.

In S105, the turbine housing 6 is subjected to a steam treatment to form an oxide film (for example, an $Fe_3O_4$ film) on the surface of the turbine housing 6. In the steam treatment, the thickness of the oxide film is adjusted so as not to impair the function and assembling properties of the turbocharger 2. The thickness of the oxide film can be adjusted by the treatment temperature and treatment time of the steam treatment, and the installation location of the turbine housing 6 in the steam treatment furnace. The thickness of the oxide film formed on the turbine housing 6 may be, for example, 10 to 30 μm. By setting the thickness of the oxide film to 10 μm or more, the corrosion resistance of the turbine housing 6 can be effectively improved. By setting the thickness of the oxide film to 30 μm or less, the deterioration of the function and assembling properties of the turbocharger 2 can be effectively suppressed. Moreover, the treatment temperature and treatment time of the steam treatment are adjusted not only for adjusting the film thickness, but also so that the thermal deformation and high-temperature fatigue strength of the turbine housing 6 do not change.

The treatment temperature of the steam treatment of the turbine housing 6 may be, for example, 650° C. or less.

In S106, the bearing housing 10 is subjected to a steam treatment to form an oxide film (for example, an $Fe_3O_4$ film) on the surface of the bearing housing 10. In the steam treatment, the thickness of the oxide film is adjusted so as not to impair the function and assembling properties of the turbocharger 2. The thickness of the oxide film can be adjusted by the treatment temperature and treatment time of the steam treatment, and the installation location of the bearing housing 10 in the steam treatment furnace. The thickness of the oxide film formed on the bearing housing 10 may be, for example, 10 to 30 μm. By setting the thickness of the oxide film to 10 μm or more, the corrosion resistance of the bearing housing 10 can be effectively improved. By setting the thickness of the oxide film to 30 μm or less, the deterioration of the function and assembling properties of the turbocharger 2 can be effectively suppressed. In addition, the treatment temperature and treatment time are adjusted not only for adjusting the film thickness, but also so that the thermal deformation and high-temperature fatigue strength of the bearing housing 10 do not change. The treatment temperature of the steam treatment of the bearing housing 10 may be, for example, 650° C. or less.

In S107, the turbine housing 6 on which the oxide film is formed, the bearing housing 10 on which the oxide film is formed, and the compressor housing 14 are assembled. In S107, the turbine housing 6 and the bearing housing 10 are assembled so that the first portion 30 of the turbine housing 6 and the second portion 32 of the bearing housing 10 are fitted together, and the bearing housing 10 and the compressor housing 14 are assembled so that the third portion 34 of the bearing housing 10 and the fourth portion 58 of the compressor housing 14 are fitted together. Note that the compressor housing 14 is molded by casting, for example, using an aluminum alloy as a material before S107.

In the method of manufacturing the casing 5 described above, the step (S105) of subjecting the turbine housing 6 to a steam treatment is performed between the step (S103) of cutting the turbine housing 6 and the step (S107) of assembling the casing 5. The step (S106) of subjecting the bearing housing 10 to a steam treatment is performed between the step (S104) of cutting the bearing housing 10 and the step (S107) of assembling the casing 5. Therefore, the step (S105) of subjecting the turbine housing 6 to a steam treatment is performed after the step (S103) of cutting the turbine housing 6, and the step (S106) of subjecting the bearing housing 10 to a steam treatment is performed after the step (S104) of cutting the bearing housing 10.

In the casing 5 of the turbocharger 2 manufactured in this manner, an oxide film on the cut machined surface is formed on the surface of the first portion 30 of the turbine housing 6, and an oxide film on the cut machined surface is formed on the second portion 32 of the bearing housing 10. Further, an oxide film is formed on the cut machined surfaces of the bearing support portion 36, the lubricating-oil inlet-side end surface 40, the lubricating-oil outlet-side end surface 44, and the third portion 34 of the bearing housing 10.

According to the manufacturing method of the casing 5 described above, due to the oxide film formed on each of the turbine housing 6 and the bearing housing 10 by the steam treatment, it is possible to maintain higher corrosion resistance than a general coating agent (for example, Pyrosin (registered trademark) KS black or the like) for rust prevention.

Further, as described above, the step (S105) of subjecting the turbine housing 6 to a steam treatment is performed between the step (S103) of cutting the turbine housing 6 and the step (S107) of assembling the casing 5, and the step (S106) of subjecting the bearing housing 10 to a steam treatment is performed between the step (S104) of cutting the bearing housing 10 and the step (S107) of assembling the casing 5.

Therefore, the state in which the oxide film of the turbine housing 6 is formed on the entire turbine housing 6 can be maintained, and high corrosion resistance of the turbine housing 6 can be realized. In addition, the state in which the oxide film of the bearing housing 10 is formed on the entire bearing housing 10 can be maintained, and high corrosion resistance of the bearing housing 10 can be realized.

In addition, the dimensions of the bearing housing 10 molded in S102 are set in consideration of the thickness of the oxide film formed on the bearing housing 10, the thickness of the oxide film formed on the turbine housing 6 in S105 is adjusted appropriately, and the thickness of the oxide film formed on the bearing housing 10 in S106 is adjusted appropriately. Thus, the corrosion resistance can be improved without impairing the function and assembling properties of the turbocharger 2.

Figure 4:
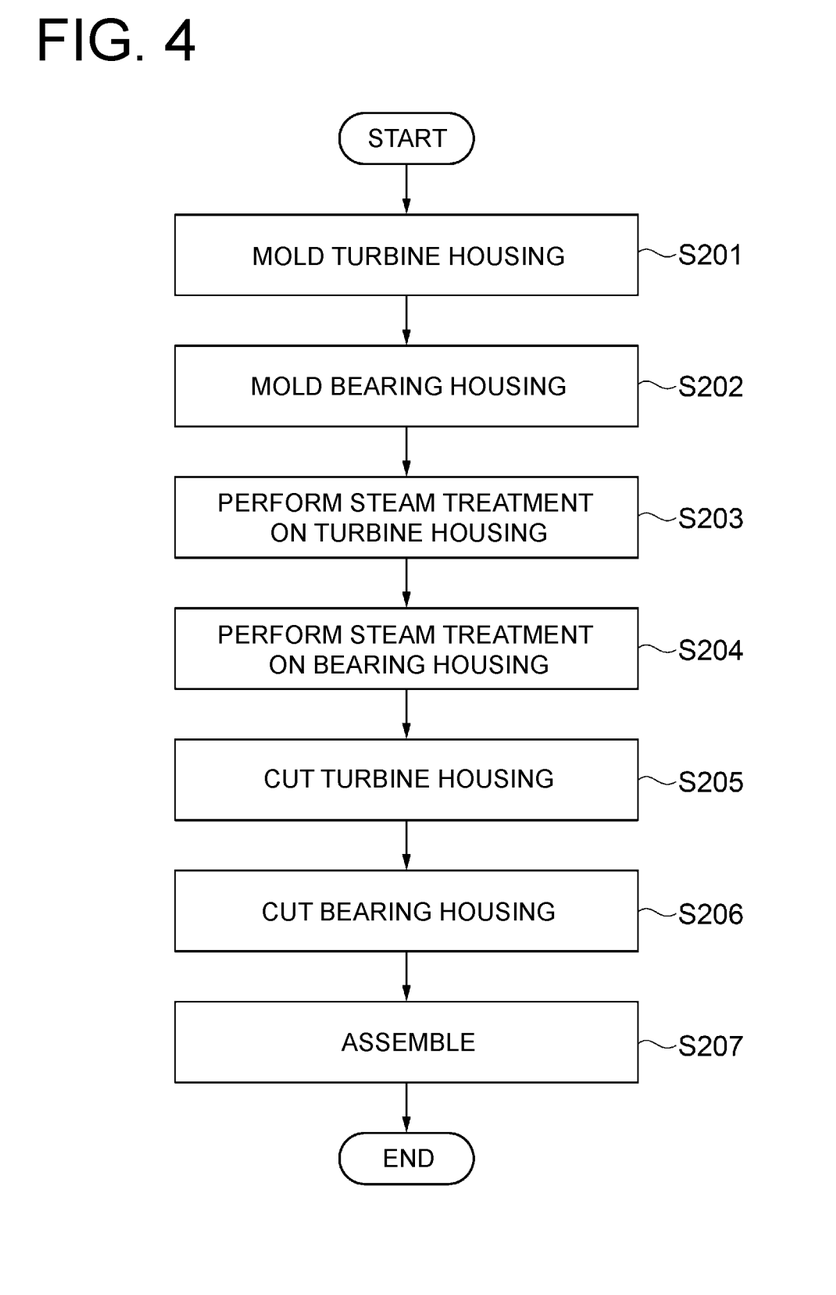
FIG. 4 is a flowchart showing another example of a method of manufacturing the casing 5 of the turbocharger 2.

Next, another example of the method of manufacturing the casing 5 of the turbocharger 2 described above will be described with reference to FIGS. 4 and 3. FIG. 4 is a flowchart showing another example of a method of manufacturing the casing 5 of the turbocharger 2 described above. The manufacturing method shown in FIG. 4 is different from the manufacturing method shown in FIG. 2 in that the order of the steam treatment and the cutting for the turbine housing 6 and the bearing housing 10 is different.

As shown in FIG. 4, in S201, the turbine housing 6 is molded by casting or the like using the above-described materials. At this time, the turbine housing 6 is molded while leaving a cutting allowance in at least the first portion 30 of the turbine housing 6.

In S202, the bearing housing 10 is molded by casting or the like using the above-described materials. At this time, the bearing housing 10 is molded while leaving a cutting allowance in at least the second portion 32 of the bearing housing 10. In the example shown in FIG. 3, the bearing housing 10 is molded while leaving a cutting allowance in the second portion 32, the third portion 34, the bearing support portion 36, the lubricating-oil inlet-side end surface 40, and the lubricating-oil outlet-side end surface 44 of the bearing housing 10. In the manufacturing method shown in FIG. 4, when setting the dimensions of the bearing housing 10 molded in S202, it is not necessary to consider the thickness of the oxide film formed on the bearing housing 10, which will be described later.

In S203, the turbine housing 6 is subjected to a steam treatment to form an oxide film (for example, an $Fe_3O_4$ film)

on the surface of the turbine housing 6. In the steam treatment, the thickness of the oxide film is adjusted so as not to impair the function and assembling properties of the turbocharger 2. The thickness of the oxide film can be adjusted by the treatment temperature and treatment time of the steam treatment, and the installation location of the turbine housing 6 in the steam treatment furnace. The thickness of the oxide film formed on the turbine housing 6 may be, for example, 10 to 30 μm. By setting the thickness of the oxide film to 10 μm or more, the corrosion resistance of the turbine housing 6 can be effectively improved. By setting the thickness of the oxide film to 30 μm or less, the deterioration of the function and assembling properties of the turbocharger 2 can be effectively suppressed. Moreover, the treatment temperature and treatment time are adjusted not only for adjusting the film thickness, but also so that the thermal deformation and high-temperature fatigue strength of the turbine housing 6 do not change. The treatment temperature of the steam treatment of the turbine housing 6 may be, for example, 650° C. or less.

In S204, the bearing housing 10 is subjected to a steam treatment to form an oxide film (for example, an $Fe_3O_4$ film) on the surface of the bearing housing 10. In the steam treatment, the thickness of the oxide film is adjusted so as not to impair the function and assembling properties of the turbocharger 2. The thickness of the oxide film can be adjusted by the treatment temperature and treatment time of the steam treatment, and the installation location of the bearing housing 10 in the steam treatment furnace. The thickness of the oxide film formed on the bearing housing 10 may be, for example, 10 to 30 μm. By setting the thickness of the oxide film to 10 μm or more, the corrosion resistance of the bearing housing 10 can be effectively improved. By setting the thickness of the oxide film to 30 μm or less, the deterioration of the function and assembling properties of the turbocharger 2 can be effectively suppressed. In addition, the treatment temperature and treatment time are adjusted not only for adjusting the film thickness, but also so that the thermal deformation and high-temperature fatigue strength of the bearing housing 10 do not change. The treatment temperature of the steam treatment of the bearing housing 10 may be, for example, 650° C. or less.

In S205, as shown in FIG. 3, at least the first portion 30 (the portion to be fitted with the bearing housing 10) of the turbine housing 6 is cut so that the first portion 30 is machined to have dimensions and shape appropriate for being fitted with the bearing housing 10 with high accuracy. At this time, the oxide film and the cutting allowance formed on at least the first portion 30 of the turbine housing 6 are removed by cutting.

In S206, as shown in FIG. 3, at least the second portion 32 (the portion to be fitted with the first portion 30 of the turbine housing 6) of the bearing housing 10 is cut, so that the second portion 32 is machined to have dimensions and shape appropriate for being fitted with the turbine housing 6 with high accuracy. In the example shown in FIG. 3, furthermore, the bearing support portion 36 is machined to have dimensions and shape appropriate for being fitted with the outer peripheral surface of the bearing 8 with high accuracy. In addition, the lubricating-oil inlet-side end surface 40 and the lubricating-oil outlet-side end surface 44 are cut into smooth surfaces so that the lubricating oil does not leak. Further, the third portion 34 is machined to have dimensions and shape appropriate for being fitted with the compressor housing 14 with high accuracy. At this time, the oxide film and the cutting allowance formed on at least the second portion 32 of the bearing housing 10 are removed by cutting. In the example shown in FIG. 3, the oxide film and the cutting allowance formed on each of the second portion 32, the third portion 34, the bearing support portion 36, the lubricating-oil inlet-side end surface 40, and the lubricating-oil outlet-side end surface 44 of the bearing housing 10 are removed by cutting.

In S207, the turbine housing 6 on which the oxide film is formed, the bearing housing 10 on which the oxide film is formed, and the compressor housing 14 are assembled. In S107, the turbine housing 6 and the bearing housing 10 are assembled so that the first portion 30 of the turbine housing 6 and the second portion 32 of the bearing housing 10 are fitted together, and the bearing housing 10 and the compressor housing 14 are assembled so that the third portion 34 of the bearing housing 10 and the fourth portion 58 of the compressor housing 14 are fitted together. Note that the compressor housing 14 is molded by casting, for example, using an aluminum alloy as a material before S207.

In the method of manufacturing the casing 5 described above, the step (S205) of cutting the turbine housing 6 is performed between the step (S203) of subjecting the turbine housing 6 to a steam treatment and the step (S207) of assembling the casing 5. The step (S206) of cutting the bearing housing 10 is performed between the step (S204) of subjecting the bearing housing 10 to a steam treatment and the step (S207) of assembling the casing 5. Therefore, the step (S205) of cutting the turbine housing 6 is performed after the step (S203) of subjecting the turbine housing 6 to a steam treatment, and the step (S206) of cutting the bearing housing 10 is performed after the step (S204) of subjecting the bearing housing 10 to a steam treatment.

In the casing 5 of the turbocharger 2 manufactured in this manner, the cut machined surface is formed on the surface of the first portion 30 of the turbine housing 6, and the cut machined surface is formed on the surface of the second portion 32 of the bearing housing 10. Further, the cut machined surface is formed on the surfaces of the bearing support portion 36, the lubricating-oil inlet-side end surface 40, the lubricating-oil outlet-side end surface 44, and the third portion 34 of the bearing housing 10.

Moreover, an oxide film is formed on at least a portion of the surface of the turbine housing 6 excluding the first portion 30. Moreover, an oxide film is formed on at least a portion of the bearing housing 10 excluding the second portion 32 (in the example shown in FIG. 3, at least a portion of the portion of the bearing housing 10 excluding the second portion 32, the third portion 34, the bearing support portion 36, the lubricating-oil inlet-side end surface 40, and the lubricating-oil outlet-side end surface 44).

According to the manufacturing method of the casing 5 described above, due to the oxide film formed on each of the turbine housing 6 and the bearing housing 10 by the steam treatment, it is possible to maintain higher corrosion resistance than a general coating agent (for example, Pyrosin (registered trademark) KS black or the like) for rust prevention.

Further, as described above, the step (S205) of cutting the turbine housing 6 is performed between the step (S203) of subjecting the turbine housing 6 to a steam treatment and the step (S207) of assembling the casing 5. The step (S206) of cutting the bearing housing 10 is performed between the step (S204) of subjecting the bearing housing 10 to a steam treatment and the step (S207) of assembling the casing 5. Therefore, it is not necessary to change the dimensions of the turbine housing 6 and the bearing housing 10 in consideration of the thickness of the oxide film formed on the surface of the turbine housing 6 and the surface of the bearing housing 10. Further, even if there is an error in the thickness of the oxide film formed by the steam treatment for each of the turbine housing 6 and the bearing housing 10, since cutting is performed after the steam treatment, the control of dimensions of the turbine housing 6 and bearing housing 10 becomes easy. Therefore, the corrosion resistance can be improved without impairing the function and assembling properties of the turbocharger 2. In particular, since the bearing support portion 36, which requires high dimensional accuracy, can be machined into appropriate dimensions and shape, it is possible to improve corrosion resistance while suppressing deterioration in bearing performance.

Figure 5:
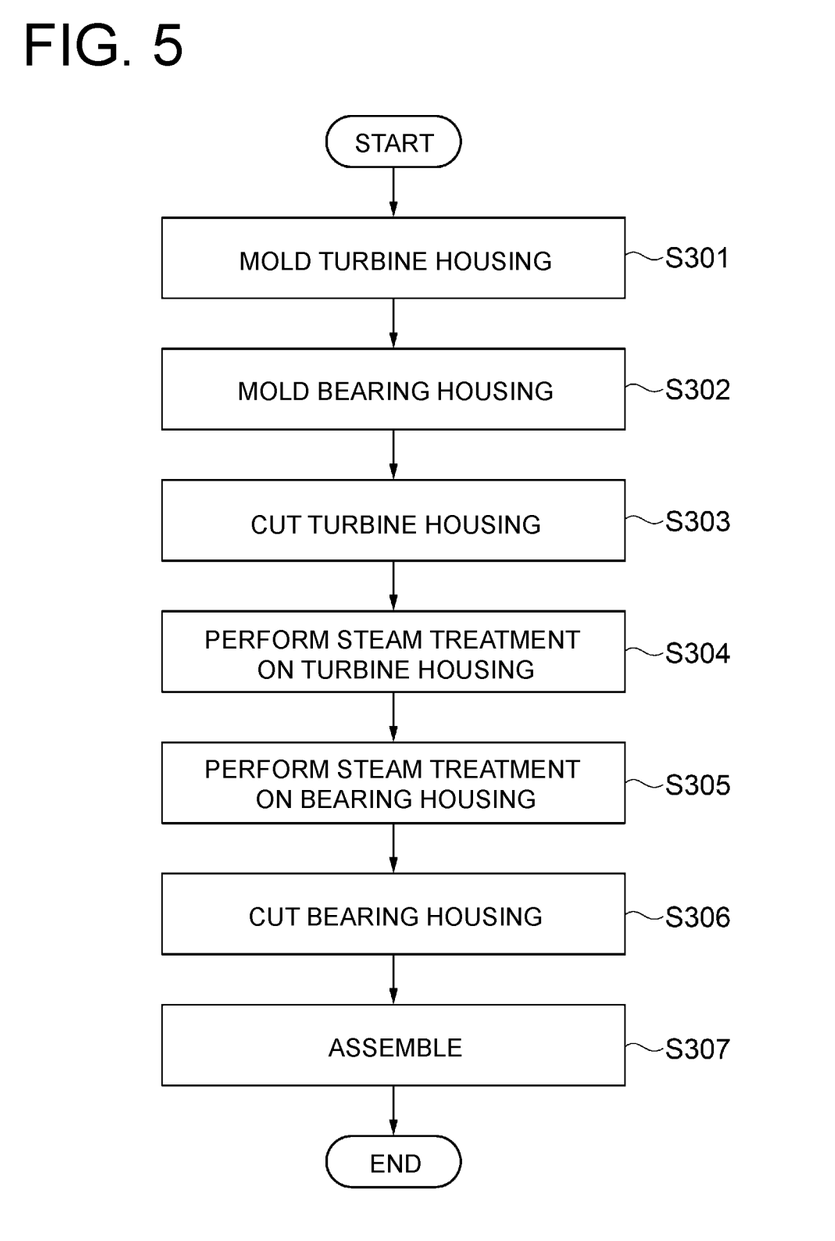
FIG. 5 is a flowchart showing another example of a method of manufacturing the casing 5 of the turbocharger 2.

Next, another example of the method of manufacturing the casing 5 of the turbocharger 2 described above will be described with reference to FIGS. 5 and 3. FIG. 5 is a flowchart showing another example of a method of manufacturing the casing 5 of the turbocharger 2 described above. The manufacturing method shown in FIG. 5 is different from the manufacturing method shown in FIG. 2 in that the order of the steam treatment and cutting of the bearing housing 10 is different.

As shown in FIG. 5, in S301, the turbine housing 6 is molded by casting or the like using the above-described materials. At this time, the turbine housing 6 is molded while leaving a cutting allowance in at least the first portion 30 of the turbine housing 6.

In S302, the bearing housing 10 is molded by casting or the like using the above-described materials. At this time, the bearing housing 10 is molded while leaving a cutting allowance in at least the second portion 32 of the bearing housing 10. In the example shown in FIG. 3, the bearing housing 10 is molded while leaving a cutting allowance in the second portion 32, the third portion 34, the bearing support portion 36, the lubricating-oil inlet-side end surface 40, and the lubricating-oil outlet-side end surface 44 of the bearing housing 10.

In the manufacturing method shown in FIG. 5, when setting the dimensions of the bearing housing 10 molded in S302, it is not necessary to consider the thickness of the oxide film formed on the bearing housing 10, which will be described later.

In S303, as shown in FIG. 3, at least the first portion 30 (the portion to be fitted with the bearing housing 10) of the turbine housing 6 is cut so that the first portion 30 is machined to have dimensions and shape appropriate for being fitted with the bearing housing 10 with high accuracy. At this time, the cutting allowance of the turbine housing 6 is removed by cutting.

In S304, the turbine housing 6 is subjected to a steam treatment to form an oxide film (for example, an $Fe_3O_4$ film) on the surface of the turbine housing 6. In the steam treatment, the thickness of the oxide film is adjusted so as not to impair the function and assembling properties of the turbocharger 2. The thickness of the oxide film can be adjusted by the treatment temperature and treatment time of the steam treatment, and the installation location of the turbine housing 6 in the steam treatment furnace. The thickness of the oxide film formed on the turbine housing 6 may be, for example, 10 to 30 µm. By setting the thickness of the oxide film to 10 µm or more, the corrosion resistance of the turbine housing 6 can be effectively improved. By setting the thickness of the oxide film to 30 µm or less, the deterioration of the function and assembling properties of the turbocharger 2 can be effectively suppressed. Moreover, the treatment temperature and treatment time of the steam treatment are adjusted not only for adjusting the film thickness, but also so that the thermal deformation and high-temperature fatigue strength of the turbine housing 6 do not change. The treatment temperature of the steam treatment of the turbine housing 6 may be, for example, 650° C. or less.

In S305, the bearing housing 10 is subjected to a steam treatment to form an oxide film (for example, an $Fe_3O_4$ film) on the surface of the bearing housing 10. In the steam treatment, the thickness of the oxide film is adjusted so as not to impair the function and assembling properties of the turbocharger 2. The thickness of the oxide film can be adjusted by the treatment temperature and treatment time of the steam treatment, and the installation location of the bearing housing 10 in the steam treatment furnace. The thickness of the oxide film formed on the bearing housing 10 may be, for example, 10 to 30 µm. By setting the thickness of the oxide film to 10 µm or more, the corrosion resistance of the bearing housing 10 can be effectively improved. By setting the thickness of the oxide film to 30 µm or less, the deterioration of the function and assembling properties of the turbocharger 2 can be effectively suppressed. In addition, the treatment temperature and treatment time are adjusted not only for adjusting the film thickness, but also so that the thermal deformation and high-temperature fatigue strength of the bearing housing 10 do not change. The treatment temperature of the steam treatment of the bearing housing 10 may be, for example, 650° C. or less.

In S306, as shown in FIG. 3, at least the second portion 32 (the portion to be fitted with the first portion 30 of the turbine housing 6) of the bearing housing 10 is cut, so that the second portion 32 is machined to have dimensions and shape appropriate for being fitted with the turbine housing 6 with high accuracy. In the example shown in FIG. 3, furthermore, the bearing support portion 36 is machined to have dimensions and shape appropriate for being fitted with the outer peripheral surface of the bearing 8 with high accuracy. In addition, the lubricating-oil inlet-side end surface 40 and the lubricating-oil outlet-side end surface 44 are cut into smooth surfaces so that the lubricating oil does not leak. Further, the third portion 34 is machined to have dimensions and shape appropriate for being fitted with the compressor housing 14 with high accuracy. At this time, the oxide film and the cutting allowance formed on at least the second portion 32 of the bearing housing 10 are removed by cutting. In the example shown in FIG. 3, the oxide film and the cutting allowance formed on each of the second portion 32, the third portion 34, the bearing support portion 36, the lubricating-oil inlet-side end surface 40, and the lubricating-oil outlet-side end surface 44 of the bearing housing 10 are removed by cutting.

In S307, the turbine housing 6 on which the oxide film is formed, the bearing housing 10 on which the oxide film is formed, and the compressor housing 14 are assembled. In S307, the turbine housing 6 and the bearing housing 10 are assembled so that the first portion 30 of the turbine housing 6 and the second portion 32 of the bearing housing 10 are fitted together, and the bearing housing 10 and the compressor housing 14 are assembled so that the third portion 34 of the bearing housing 10 and the fourth portion 58 of the compressor housing 14 are fitted together. Note that the compressor housing 14 is molded by casting, for example, using an aluminum alloy as a material before S307.

In the method of manufacturing the casing 5 described above, the step (S304) of subjecting the turbine housing 6 to a steam treatment is performed between the step (S303) of cutting the turbine housing 6 and the step (S307) of assembling the casing 5. The step (S306) of cutting the bearing housing 10 is performed between the step (S305) of subjecting the bearing housing 10 to a steam treatment and the step (S307) of assembling the casing 5. Therefore, the step (S304) of subjecting the turbine housing 6 to a steam treatment is performed after the step (S303) of cutting the turbine housing 6, and the step (S306) of cutting the bearing housing 10 is performed after the step (S305) of subjecting the bearing housing 10 to a steam treatment.

In the casing 5 of the turbocharger 2 manufactured in this way, an oxide film is formed on the entire surface of the turbine housing 6. More specifically, an oxide film on the cut machined surface is formed on the surface of the first portion 30 of the turbine housing 6, and an oxide film is also formed on the surface of the portion of the turbine housing 6 excluding the first portion 30.

A cut machined surface is formed on the surface of the second portion 32 of the bearing housing 10. Further, the cut machined surface is formed on the surfaces of the bearing support portion 36, the lubricating-oil inlet-side end surface 40, the lubricating-oil outlet-side end surface 44, and the third portion 34 of the bearing housing 10.

Moreover, an oxide film is formed on at least a portion of the bearing housing 10 excluding the second portion 32 (in the example shown in FIG. 3, at least a portion of the portion of the bearing housing 10 excluding the second portion 32, the third portion 34, the bearing support portion 36, the lubricating-oil inlet-side end surface 40, and the lubricating-oil outlet-side end surface 44).

According to the manufacturing method of the casing 5 described above, due to the oxide film formed on each of the turbine housing 6 and the bearing housing 10 by the steam treatment, it is possible to maintain higher corrosion resistance than a general coating agent (for example, Pyrosin (registered trademark) KS black or the like) for rust prevention.

Further, as described above, the step (S304) of subjecting the turbine housing 6 to a steam treatment is performed between the step (S303) of cutting the turbine housing 6 and the step (S307) of assembling the casing 5. The step (S306) of cutting the bearing housing 10 is performed between the step (S305) of subjecting the bearing housing 10 to a steam treatment and the step (S307) of assembling the casing 5.

Therefore, since an oxide film is formed on the turbine housing 6 after cutting, which occupies the largest portion of the appearance and is exposed to high-temperature gas, high corrosion resistance can be maintained. In addition, since the bearing housing 10 including the bearing support portion 36, which requires high dimensional accuracy, can be machined into appropriate dimensions and shape by performing cutting after the steam treatment, corrosion resistance can be improved while suppressing deterioration in the bearing performance.

Therefore, it is possible to machine the bearing housing 10, which contributes to bearing performance, into appropriate dimensions and shape while effectively improving the corrosion resistance of the turbine housing 6, which is exposed to high-temperature gas, and to effectively enhance the corrosion resistance and bearing performance of the casing 5.

Figure 6:
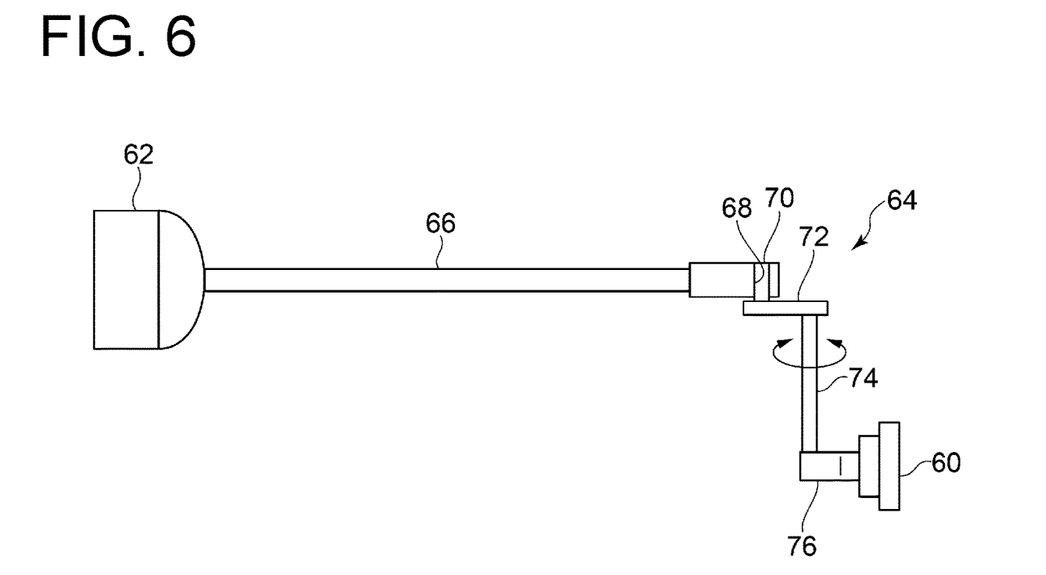
FIG. 6 is a schematic diagram showing the configuration of a wastegate valve 60, an actuator 62 and a drive transmission mechanism 64.

In some embodiments, for example, as shown in FIG. 6, the turbocharger 2 may further include a wastegate valve 60 provided in an exhaust gas passage (not shown) bypassing the turbine rotor 4, an actuator 62 that generates driving force for opening and closing the wastegate valve 60, and a drive transmission mechanism 64 for transmitting driving force from the actuator 62 to the wastegate valve 60.

In the illustrated exemplary form, drive transmission mechanism 64 includes a rod 66, a pin 70, an arm 72, a shaft 74 and a support portion 76.

The rod 66 is connected to the actuator 62 and receives driving force from the actuator 62 to reciprocate. A rod hole 68 is formed in the end of the rod 66 opposite to the actuator 62, and the pin 70 is inserted through the rod hole 68. The inner peripheral surface of the rod hole 68 and the outer peripheral surface of the pin 70 slide when the shaft 74 rotates. The pin 70 is connected to one end of the arm 72 and the shaft 74 is connected to the other end of the arm 72. The shaft 74 is connected to the wastegate valve 60 via the support portion 76 on the opposite side of the arm 72.

With such a configuration, the reciprocating motion of the rod 66 is converted into rotary motion of the shaft 74 via the pin 70 and the arm 72, and the rotary motion of the shaft 74 is transmitted to the wastegate valve 60 via the support portion 76 so that the wastegate valve 60 opens and closes.

Further, when manufacturing the turbocharger 2 including the configuration shown in FIG. 6, the rod 66 may be subjected to a steam treatment to form an oxide film.

Conventionally, the rod 66 has been made of stainless steel or electrogalvanized for rust prevention. However, it is difficult to apply galvanization to complicated shapes such as the inner peripheral surface of the rod hole 68, and there is a possibility that the inner peripheral surface of the rod hole 68 and the outer peripheral surface of the pin 70 will stick together. On the other hand, the steam treatment has few restrictions on the size and shape of the object, and by subjecting the rod 66 to the steam treatment, it is possible to form an oxide film satisfactorily on the inner peripheral surface of the rod hole 68. Thus, it is possible to improve the corrosion resistance of the rod hole 68, and suppress sticking between the rod hole 68 and the pin 70.

Further, since the steam treatment improves wear resistance, it is possible to reduce wear due to sliding between the inner peripheral surface of the rod hole 68 and the outer peripheral surface of the pin 70.

The present disclosure is not limited to the above-described embodiments but includes modifications of the above-described embodiments and appropriate combinations of these modifications.

For example, in the embodiment described above, both the turbine housing 6 and the bearing housing 10 are subjected to the steam treatment, but the steam treatment may be performed only on the turbine housing 6 or only on the bearing housing 10. By subjecting at least one of the turbine housing 6 and the bearing housing 10 to the steam treatment, the corrosion resistance of the casing 5 can be improved in the portion subjected to the steam treatment.

Further, in some methods of manufacturing the casing 5 described with reference to FIGS. 2, 4 and 5, the step of subjecting the turbine housing 6 to a steam treatment and the step of subjecting the bearing housing 10 to a steam treatment have been described as separate steps for the sake of convenience. However, the turbine housing 6 and the bearing housing 10 may be placed in one steam treatment furnace and subjected to a steam treatment at the same time.

In some of the embodiments described above, in the step of cutting the bearing housing 10, the oxide film formed on the second portion 32, the third portion 34, the bearing support portion 36, the lubricating-oil inlet-side end surface 40 and the lubricating-oil outlet-side end surface 44 is removed by cutting. However, it is not essential to remove the oxide film formed on all of them by cutting, and it is desirable that at least the oxide film formed on the second portion 32 should be removed by cutting. Furthermore, the oxide film formed on at least one of the third portion 34, the bearing support portion 36, the lubricating-oil inlet-side end surface 40, and the lubricating-oil outlet-side end surface 44 may be removed by cutting.

In addition, in FIG. 3, an example of a portion of the casing 5 where cutting is performed (a portion including a cutting allowance) is indicated by thick lines. However, the portion of the casing 5 where cutting is performed is not limited to the portion shown in FIG. 3, but the portion may be any other portion where high dimensional accuracy is required.

Further, in some of the above-described embodiments, cutting was shown as an example of machining of the turbine housing 6 and the bearing housing 10, but instead of or in addition to cutting, machining such as grinding, polishing, or the like may also be performed.

The contents described in each of the above-described embodiments are grasped as follows, for example.

(1) A method of manufacturing a casing (for example, the above-described casing 5) of a turbocharger (for example, the above-described turbocharger 2) according to the present disclosure, the casing including a turbine housing (for example, the above-described turbine housing 6) that houses a turbine rotor (for example, the above-described turbine rotor 4) of the turbocharger, a bearing housing (for example, the above-described bearing housing 10) that houses a bearing (for example, the above-described bearing 8) that rotatably supports the turbine rotor, and a compressor housing (for example, the above-described compressor housing 14) that houses a compressor impeller (for example, the above-described compressor impeller 12) of the turbocharger, the method including: a steam treatment step (for example, the above-described steps S105, S106, S203, S204, S304, and S305) of subjecting at least one of the turbine housing and the bearing housing to a steam treatment to form an oxide film on the at least one of the turbine housing and the bearing housing; and an assembling step (for example, the above-described steps S107, S207, and S307) of assembling the turbine housing, the bearing housing and the compressor housing.

According to the method of manufacturing the casing of the turbocharger described in (1), an oxide film is formed on at least one of the turbine housing and the bearing housing by subjecting at least one of the turbine housing and the bearing housing to a steam treatment. As a result, the corrosion resistance of the portion where the oxide film is formed in at least one of the turbine housing and the bearing housing can be improved, and rusting of the casing can be suppressed.

(2) In some embodiments, in the method of manufacturing the casing of the turbocharger according to (1), wherein in the steam treatment step, at least one of the turbine housing and the bearing housing is subjected to the steam treatment before assembling the turbine housing, the bearing housing and the compressor housing.

Generally, in a turbocharger, high-temperature exhaust gas from the engine is supplied to the turbine side, while relatively low-temperature air is supplied to the compressor side. Thus, materials with high-temperature resistance are used for the turbine housing, and materials with lower high-temperature resistance than the turbine housing are used for the compressor housing. For this reason, if the turbine housing, bearing housing, and compressor housing are subjected to a steam treatment after being assembled, the compressor housing may be thermally deformed.

On the other hand, in the casing manufacturing method described in (2), at least one of the turbine housing and the bearing housing is subjected to a steam treatment before assembling the turbine housing, the bearing housing, and the compressor housing. Thus, thermal deformation of the compressor housing due to the steam treatment can be avoided. Therefore, the corrosion resistance of the casing can be improved while avoiding thermal deformation of the compressor housing due to the steam treatment.

(3) In some embodiments, in the method of manufacturing the casing of the turbocharger according to (2), wherein the steam treatment step includes: a turbine housing steam (for example, the above-described steps S105, S203, and S304) treatment step of subjecting the turbine housing to the steam treatment to form an oxide film on the turbine housing before assembling the turbine housing, the bearing housing and the compressor housing; and a bearing housing steam treatment step (for example, the above-described steps S106, S204, and S305) of subjecting the bearing housing to the steam treatment to form an oxide film on the bearing housing before assembling the turbine housing, the bearing housing and the compressor housing.

According to the method of manufacturing the casing of the turbocharger described in (3), since the turbine housing and the bearing housing are subjected to the steam treatment before the turbine housing, the bearing housing, and the compressor housing are assembled, it is possible to avoid thermal deformation of the compressor housing due to the steam treatment. Therefore, rusting of the casing can be suppressed while avoiding thermal deformation of the compressor housing due to the steam treatment.

(4) In some embodiments, in the method of manufacturing the casing of the turbocharger according to (3), wherein the compressor housing is not subjected to the steam treatment.

According to the method of manufacturing the casing of the turbocharger described in (4), by subjecting the turbine housing and the bearing housing to the steam treatment without subjecting the compressor housing to the steam treatment, the corrosion resistance of the casing can be improved while avoiding thermal deformation of the compressor housing due to the steam treatment.

(5) In some embodiments, in the method of manufacturing the casing of the turbocharger according to (3) or (4), further including: a turbine housing machining step (for example, the above-described steps S103, S205, and S303) of machining the turbine housing; and a bearing housing machining step (for example, the above-described steps S104, S206, and S306) of machining the bearing housing.

According to the method of manufacturing the casing of the turbocharger described in (5), the turbine housing and the bearing housing can be machined into appropriate dimensions and shapes.

(6) In some embodiments, in the method of manufacturing the casing of the turbocharger according to (5), wherein the turbine housing machining step is performed between the turbine housing steam treatment step and the assembling step, and the bearing housing machining step is performed between the bearing housing steam treatment step and the assembling step.

According to the method of manufacturing the casing of the turbocharger described in (6), the turbine housing machining step is performed after the turbine housing steam treatment step, and the bearing housing machining step is performed after the bearing housing steam treatment step. Therefore, it is not necessary to change the dimensions of the turbine housing and the bearing housing in consideration of the thickness of the oxide film formed on the surface of the turbine housing and the surface of the bearing housing.

Further, even if there is an error in the thickness of the oxide film formed by the steam treatment for each of the turbine housing and the bearing housing, since cutting is performed after the steam treatment, the control of dimensions of the turbine housing and bearing housing becomes easy. Therefore, the corrosion resistance can be improved without impairing the function and assembling properties of the turbocharger, and deterioration of the bearing performance can be suppressed.

(7) In some embodiments, in the method of manufacturing the casing of the turbocharger according to (6), wherein the turbine housing includes a first portion (for example, the above-described first portion 30) that fits with the bearing housing, the bearing housing includes a second portion (for example, the above-described second portion 32) that fits with the first portion of the turbine housing, in the turbine housing machining step, an oxide film formed on at least the first portion of the turbine housing is removed by machining after the turbine housing steam treatment step, and in the bearing housing machining step, an oxide film formed on at least the second portion of the bearing housing is removed by machining after the bearing housing steam treatment step.

According to the method of manufacturing the casing of the turbocharger described in (7), it is possible to improve the corrosion resistance of the casing while achieving a satisfactory fitting state between the turbine housing and the bearing housing.

(8) In some embodiments, in the method of manufacturing the casing of the turbocharger according to (7), further including: a turbine housing molding step (for example, the above-described steps S101, S201, and S301) of molding the turbine housing while leaving a cutting allowance in at least the first portion of the turbine housing; and a bearing housing molding step (for example, the above-described steps S102, S202, and S302) for example, the above-described of molding the bearing housing while leaving a cutting allowance in at least the second portion of the bearing housing.

According to the method of manufacturing the casing of the turbocharger described in (8), the oxide film and the cutting allowance are removed by cutting from each of the turbine housing and the bearing housing. The corrosion resistance of the casing can be improved while realizing a satisfactory fitting state between the turbine housing and the bearing housing.

(9) In some embodiments, in the method of manufacturing the casing of the turbocharger according to (8), wherein in the turbine housing machining step, an oxide film formed on at least the first portion of the turbine housing and the cutting allowance of the turbine housing are removed by machining, and in the bearing housing machining step, an oxide film formed on at least the second portion of the bearing housing and the cutting allowance of the bearing housing are removed by machining.

According to the method of manufacturing the casing of the turbocharger described in (9), it is possible to improve the corrosion resistance of the casing while achieving a satisfactory fitting state between the turbine housing and the bearing housing.

(10) In some embodiments, in the method of manufacturing the casing of the turbocharger according to (6), wherein the bearing housing includes: a bearing support portion (for example, the above-described bearing support portion 36) that supports the bearing; a lubricating-oil inlet-side end surface (for example, the above-described lubricating-oil inlet-side end surface 40) in which an inlet (for example, the above-described inlet 38) for lubricating oil to be supplied to the bearing is formed; a lubricating-oil outlet-side end surface (for example, the above-described lubricating-oil outlet-side end surface 44) in which an outlet (for example, the above-described outlet 42) of the lubricating oil is formed; and a third portion (for example, the above-described third portion 34) that fits with the compressor housing of the turbocharger, and in the bearing housing machining step, an oxide film formed on at least one of the bearing support portion, the lubricating-oil inlet-side end surface, the lubricating-oil outlet-side end surface, and the third portion is removed by machining after the bearing housing steam treatment step.

According to the method of manufacturing the casing of the turbocharger described in (10), it is not necessary to change the dimensions of the bearing housing in consideration of the thickness of the oxide film formed on the surfaces of the bearing support portion, the lubricating-oil inlet-side end surface, the lubricating-oil outlet-side end surface, and the third portion. In addition, even when there is an error in the thickness of the oxide film formed by a steam treatment on at least one of the bearing support portion, the lubricating-oil inlet-side end surface, the lubricating-oil outlet-side end surface, and the third portion, since cutting is performed after the steam treatment, dimensional control becomes easy. Therefore, the corrosion resistance can be improved without impairing the function and assembling properties of the turbocharger.

(11) The method of manufacturing the casing of the turbocharger according to (5), wherein the turbine housing steam treatment step is performed between the turbine housing machining step and the assembling step, and the bearing housing steam treatment step is performed between the bearing housing machining step and the assembling step.

According to the method of manufacturing the casing of the turbocharger described in (11), the turbine housing steam treatment step is performed after the turbine housing machining step, and the bearing housing steam treatment step is performed after the bearing housing machining step. Therefore, the state in which the oxide film of the turbine housing is formed on the entire turbine housing can be maintained, and high corrosion resistance of the turbine housing can be realized. In addition, the state in which the oxide film of the bearing housing is formed on the entire bearing housing can be maintained, and high corrosion resistance of the bearing housing can be realized.

(12) In some embodiments, in the method of manufacturing the casing of the turbocharger according to (5), wherein the turbine housing steam treatment step is performed between the turbine housing machining step and the assembling step, and the bearing housing machining step is performed between the bearing housing steam treatment step and the assembling step.

According to the method of manufacturing the casing of the turbocharger described in (12), the turbine housing steam treatment step is performed after the turbine housing machining step, and the bearing housing machining step is performed after the bearing housing steam treatment step. For this reason, since an oxide film is formed on the turbine housing after cutting, which occupies the largest portion of the appearance and is exposed to high-temperature gas, high corrosion resistance can be maintained. In addition, since the bearing housing, which requires high dimensional accuracy, can be machined into appropriate dimensions and shape by performing cutting after the steam treatment, corrosion resistance can be improved while suppressing deterioration in the bearing performance.

Therefore, it is possible to machine the bearing housing, which contributes to bearing performance, into appropriate dimensions and shape while effectively improving the corrosion resistance of the turbine housing, which is exposed to high-temperature gas, and to effectively enhance the corrosion resistance and bearing performance of the casing.

(13) In some embodiments, in the method of manufacturing the casing of the turbocharger according to (1), wherein the turbocharger further includes: a wastegate valve (for example, the above-described wastegate valve 60); an actuator (for example, the above-described actuator 62) that generates driving force for opening and closing the wastegate valve; and a drive transmission mechanism (for example, the above-described drive transmission mechanism 64) for transmitting the driving force from the actuator to the wastegate valve, and the drive transmission mechanism includes a rod (for example, the above-described rod 66) and a pin (for example, the above-described pin 70) inserted through a rod hole (for example, the above-described rod hole 68) formed in the rod, the method further including: a step of subjecting at least one of an inner peripheral surface of the rod hole and an outer peripheral surface of the pin to the steam treatment to form an oxide film.

Conventionally, the rod has been made of stainless steel or electrogalvanized for rust prevention. However, it is difficult to apply galvanization to complicated shapes such as the inner peripheral surface of the rod hole, and there is a possibility that the inner peripheral surface of the rod hole and the outer peripheral surface of the pin will stick together. On the other hand, according to the method of manufacturing the casing of the turbocharger described in (13), the steam treatment has few restrictions on the size and shape of the object, and by subjecting the rod to the steam treatment, it is possible to form an oxide film satisfactorily on the inner peripheral surface of the rod hole. Thus, it is possible to improve the corrosion resistance of the rod hole, and suppress sticking between the rod hole and the pin. Further, since the steam treatment improves wear resistance, it is possible to reduce wear due to sliding between the inner peripheral surface of the rod hole and the outer peripheral surface of the pin.

(14) A casing (for example, the above-described casing 5) of a turbocharger (for example, the above-described turbocharger 2) of the present disclosure, including: a turbine housing (for example, the above-described turbine housing 6) that houses a turbine rotor (for example, the above-described turbine rotor 4) of the turbocharger; and a bearing housing (for example, the above-described bearing housing 10) that houses a bearing (for example, the above-described bearing 8) that rotatably supports the turbine rotor, wherein a machined surface is formed on a surface of a portion (for example, the above-described second portion 32) of the bearing housing that fits with the turbine housing, and an oxide film is formed on at least a portion of the surface of the bearing housing excluding the portion that fits with the turbine housing.

According to the casing of the turbocharger described in (14), it is possible to improve the corrosion resistance of the casing while realizing a satisfactory fitting state between the bearing housing and the turbine housing. An oxide film having a thickness of 10 to 30 μm may be formed on at least a portion of the surface of the bearing housing excluding a portion that fits with the turbine housing.

(15) In some embodiments, in the casing of the turbocharger according to (14), wherein a machined surface is formed on a surface of a portion (for example, the above-described first portion 30) of the turbine housing that fits with the bearing housing, and an oxide film is formed on at least a portion of the surface of the turbine housing excluding the portion that fits with the bearing housing.

According to the casing of the turbocharger described in (15), it is possible to improve the corrosion resistance of the casing while achieving a satisfactory fitting state between the bearing housing and the turbine housing. An oxide film having a thickness of 10 to 30 μm may be formed on at least a portion of the surface of the turbine housing excluding a portion that fits with the bearing housing.

(16) In some embodiments, in the casing of the turbocharger according to (14), wherein an oxide film is formed on the entire surface of the turbine housing.

According to the casing of the turbocharger described in (16), it is possible to improve the corrosion resistance of the casing while achieving a satisfactory fitting state between the bearing housing and the turbine housing.

(17) A casing (for example, the above-described casing 5) of a turbocharger (for example, the above-described turbocharger 2), including: a turbine housing (for example, the above-described turbine housing 6) that houses a turbine rotor (for example, the above-described turbine rotor 4) of the turbocharger; and a bearing housing (for example, the above-described bearing housing 10) that houses a bearing (for example, the above-described bearing 8) that rotatably supports the turbine rotor, wherein an oxide film is formed on a machined surface of a portion (for example, the above-described second portion 32) of the bearing housing that fits with the turbine housing, and an oxide film is formed on a machined surface of a portion (for example, the above-described first portion 30) of the turbine housing that fits with the bearing housing.

According to the casing of the turbocharger described in (17), it is possible to improve the corrosion resistance of the casing while achieving a satisfactory fitting state between the bearing housing and the turbine housing. An oxide film having a thickness of 10 to 30 μm may be formed on a cut machined surface on the surface of a portion of the bearing housing that fits with the turbine housing. An oxide film having a thickness of 10 to 30 m may be formed on a cut machined surface on the surface of a portion of the turbine housing that fits with the bearing housing.

REFERENCE SIGNS LIST

2 Turbocharger
3 Rotating body
4 Turbine rotor
5 Casing
6 Turbine housing
8 Bearing
10 Bearing housing
12 Compressor impeller
14 Compressor housing
16 Shaft
18 Hub
20 Turbine rotor blade
22 Scroll passage
24 Scroll portion
26 Shroud portion
28 Outlet pipe portion
30 First portion
32 Second portion
34 Third portion
36 Bearing support portion
38 Inlet 40 Lubricating-oil inlet-side end surface
42 Outlet
44 Lubricating-oil outlet-side end surface
46 Hub
48 Compressor blade
50 Inlet pipe portion
52 Shroud portion
54 Scroll passage
56 Scroll portion
58 Fourth portion
60 Wastegate valve
62 Actuator
64 Drive transmission mechanism
66 Rod
68 Rod hole
70 Pin
72 Arm
74 Shaft
76 Support portion

The invention claimed is:

1. A method of manufacturing a casing of a turbocharger, the casing including a turbine housing that houses a turbine rotor of the turbocharger, a bearing housing that houses a bearing that rotatably supports the turbine rotor, and a compressor housing that houses a compressor impeller of the turbocharger, the method comprising:
a steam treatment step of subjecting at least one of the turbine housing and the bearing housing to a steam treatment to form an oxide film on the at least one of the turbine housing and the bearing housing; and
an assembling step of assembling the turbine housing, the bearing housing and the compressor housing,
wherein the steam treatment step includes:
a turbine housing steam treatment step of subjecting the turbine housing to the steam treatment to form an oxide film on the turbine housing before assembling the turbine housing, the bearing housing and the compressor housing; and
a bearing housing steam treatment step of subjecting the bearing housing to the steam treatment to form an oxide film on the bearing housing before assembling the turbine housing, the bearing housing and the compressor housing,
wherein the method further comprising:
a turbine housing machining step of machining the turbine housing; and
a bearing housing machining step of machining the bearing housing,
wherein
the turbine housing machining step is performed between the turbine housing steam treatment step and the assembling step, and
the bearing housing machining step is performed between the bearing housing steam treatment step and the assembling step,
wherein
the turbine housing includes a first portion that fits with the bearing housing,
the bearing housing includes a second portion that fits with the first portion of the turbine housing,
in the turbine housing machining step, an oxide film formed on at least the first portion of the turbine housing is removed by machining after the turbine housing steam treatment step, and
in the bearing housing machining step, an oxide film formed on at least the second portion of the bearing housing is removed by machining after the bearing housing steam treatment step.

2. The method of manufacturing the casing of the turbocharger according to claim 1, wherein
the compressor housing is not subjected to the steam treatment.

3. The method of manufacturing the casing of the turbocharger according to claim 1, further comprising:
a turbine housing molding step of molding the turbine housing while leaving a cutting allowance in at least the first portion of the turbine housing; and
a bearing housing molding step of molding the bearing housing while leaving a cutting allowance in at least the second portion of the bearing housing.

4. The method of manufacturing the casing of the turbocharger according to claim 3, wherein
in the turbine housing machining step, an oxide film formed on at least the first portion of the turbine housing and the cutting allowance of the turbine housing are removed by machining, and
in the bearing housing machining step, an oxide film formed on at least the second portion of the bearing housing and the cutting allowance of the bearing housing are removed by machining.

5. The method of manufacturing the casing of the turbocharger according to claim 1, wherein
the turbocharger further includes:
a wastegate valve;
an actuator that generates driving force for opening and closing the wastegate valve; and
a drive transmission mechanism for transmitting the driving force from the actuator to the wastegate valve, and
the drive transmission mechanism includes a rod and a pin inserted through a rod hole formed in the rod, the method further including:
a step of subjecting at least one of an inner peripheral surface of the rod hole and an outer peripheral surface of the pin to the steam treatment to form an oxide film.

6. A method of manufacturing a casing of a turbocharger, the casing including a turbine housing that houses a turbine rotor of the turbocharger, a bearing housing that houses a bearing that rotatably supports the turbine rotor, and a compressor housing that houses a compressor impeller of the turbocharger, the method comprising:
a steam treatment step of subjecting at least one of the turbine housing and the bearing housing to a steam treatment to form an oxide film on the at least one of the turbine housing and the bearing housing; and
an assembling step of assembling the turbine housing, the bearing housing and the compressor housing,
wherein the steam treatment step includes:
a turbine housing steam treatment step of subjecting the turbine housing to the steam treatment to form an oxide film on the turbine housing before assembling the turbine housing, the bearing housing and the compressor housing; and
a bearing housing steam treatment step of subjecting the bearing housing to the steam treatment to form an oxide film on the bearing housing before assembling the turbine housing, the bearing housing and the compressor housing,
wherein the method further comprising:
a turbine housing machining step of machining the turbine housing; and
a bearing housing machining step of machining the bearing housing, wherein
the turbine housing machining step is performed between the turbine housing steam treatment step and the assembling step, and
the bearing housing machining step is performed between the bearing housing steam treatment step and the assembling step,
wherein
the bearing housing includes:
a bearing support portion that supports the bearing;
a lubricating-oil inlet-side end surface in which an inlet for lubricating oil to be supplied to the bearing is formed;
a lubricating-oil outlet-side end surface in which an outlet of the lubricating oil is formed; and
a third portion that fits with the compressor housing of the turbocharger, and
in the bearing housing machining step, an oxide film formed on at least one of the bearing support portion, the lubricating-oil inlet-side end surface, the lubricating-oil outlet-side end surface, and the third portion is removed by machining after the bearing housing steam treatment step.

7. The method of manufacturing the casing of the turbocharger according to claim 6, wherein
the compressor housing is not subjected to the steam treatment.

8. The method of manufacturing the casing of the turbocharger according to claim 6, wherein
the turbocharger further includes:
a wastegate valve;
an actuator that generates driving force for opening and closing the wastegate valve; and
a drive transmission mechanism for transmitting the driving force from the actuator to the wastegate valve, and
the drive transmission mechanism includes a rod and a pin inserted through a rod hole formed in the rod, the method further including:
a step of subjecting at least one of an inner peripheral surface of the rod hole and an outer peripheral surface of the pin to the steam treatment to form an oxide film.

9. A method of manufacturing a casing of a turbocharger, the casing including a turbine housing that houses a turbine rotor of the turbocharger, a bearing housing that houses a bearing that rotatably supports the turbine rotor, and a compressor housing that houses a compressor impeller of the turbocharger, the method consisting of:
a steam treatment step of subjecting at least one of the turbine housing and the bearing housing to a steam treatment to form an oxide film on the at least one of the turbine housing and the bearing housing;
a housing machining step of machining at least one of the turbine housing and the bearing housing; and
an assembling step of assembling the turbine housing, the bearing housing and the compressor housing,
wherein the steam treatment step is consisted of:
a turbine housing steam treatment step of subjecting the turbine housing to the steam treatment to form an oxide film on the turbine housing before assembling the turbine housing, the bearing housing and the compressor housing; and
a bearing housing steam treatment step of subjecting the bearing housing to the steam treatment to form an oxide film on the bearing housing before assembling the turbine housing, the bearing housing and the compressor housing,
wherein the housing machining step is consisted of:
a turbine housing machining step of machining the turbine housing; and
a bearing housing machining step of machining the bearing housing, wherein
the turbine housing steam treatment step is performed between the turbine housing machining step and the assembling step, and
the bearing housing steam treatment step is performed between the bearing housing machining step and the assembling step,
wherein
no machining is performed on the turbine housing after the turbine housing steam treatment step,
no machining is performed on the bearing housing after the bearing housing steam treatment step,
the turbine housing includes a first portion that fits with the bearing housing, the first portion being a portion whose surface is machined in the turbine housing machining step,
the bearing housing includes a second portion that fits with the first portion of the turbine housing, the second portion being a portion whose surface is machined in the bearing housing machining step,
in the assembling step, the oxide film formed in the turbine housing steam treatment step exists on a machined surface of the first portion and the oxide film formed in the bearing housing steam treatment step exists on a machined surface of the second portion, and
the turbine housing and the bearing housing are assembled so that the first portion of the turbine housing and the second portion of the bearing housing are fitted together,
the thickness of the oxide film formed on the turbine housing including the first portion in the turbine housing steam treatment step is 10 to 30 μm, and
the thickness of the oxide film formed on the bearing housing including the second tion in the bearing housing steam treatment step is 10 to 30 μm.

10. The method of manufacturing the casing of the turbocharger according to claim 9, wherein
the compressor housing is not subjected to the steam treatment.

11. The method of manufacturing the casing of the turbocharger according to claim 9, wherein
the turbocharger further includes:
a wastegate valve;
an actuator that generates driving force for opening and closing the wastegate valve; and
a drive transmission mechanism for transmitting the driving force from the actuator to the wastegate valve, and
the drive transmission mechanism includes a rod and a pin inserted through a rod hole formed in the rod, the method further consisting of:
a step of subjecting at least one of an inner peripheral surface of the rod hole and an outer peripheral surface of the pin to the steam treatment to form an oxide film.

12. A method of manufacturing the casing of the turbocharger
the casing including a turbine housing that houses a turbine rotor of the turbocharger, a bearing housing that houses a bearing that rotatably supports the turbine rotor, and a compressor housing that houses a compressor impeller of the turbocharger, the method comprising:
a steam treatment step of subjecting at least one of the turbine housing and the bearing housing to a steam treatment to form an oxide film on the at least one of the turbine housing and the bearing housing; and an assembling step of assembling the turbine housing, the bearing housing and the compressor housing, wherein the steam treatment step includes:

a turbine housing steam treatment step of subjecting the turbine housing to the steam treatment to form an oxide film on the turbine housing before assembling the turbine housing, the bearing housing and the compressor housing; and a bearing housing steam treatment step of subjecting the bearing housing to the steam treatment to form an oxide film on the bearing housing before assembling the turbine housing, the bearing housing and the compressor housing, wherein the method further comprises:

a turbine housing machining step of machining the turbine housing; and a bearing housing machining step of machining the bearing housing, wherein the turbine housing steam treatment step is performed between the turbine housing machining step and the assembling step, and the bearing housing machining step is performed between the bearing housing steam treatment step and the assembling step, no machining is performed on the turbine housing after the turbine housing steam treatment step, the turbine housing includes a first portion that fits with the bearing housing, the bearing housing includes a second portion that fits with the first portion of the turbine housing, in the assembling step, the turbine housing and the bearing housing are assembled so that the first portion of the turbine housing and the second portion of the bearing housing are fitted together, the thickness of the oxide film formed on the turbine housing in the turbine housing steam treatment step is 10 to 30 μm, and in the bearing housing machining step, an oxide film formed on at least the second portion of the bearing housing is removed by machining after the bearing housing steam treatment step.

13. The method of manufacturing the casing of the turbocharger according to claim 12, wherein, the compressor housing is not subjected to the steam treatment.

14. The method of manufacturing the casing of the turbocharger according to claim 12, wherein the turbocharger further includes:

a wastegate valve;

an actuator that generates driving force for opening and closing the wastegate valve; and a drive transmission mechanism for transmitting the driving force from the actuator to the wastegate valve, and the drive transmission mechanism includes a rod and a pin inserted through a rod hole formed in the rod, the method further including:

a step of subjecting at least one of an inner peripheral surface of the rod hole and an outer peripheral surface of the pin to the steam treatment to form an oxide film.

* * * * *